(12) United States Patent
Connor (10) Patent No.: US 6,868,466 B2
(45) Date of Patent: Mar. 15, 2005

(54) APPARATUS AND METHOD FOR PACKET INGRESS INTERRUPT MODERATION

(75) Inventor: Patrick L. Connor, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 510 days.

(21) Appl. No.: 09/967,300

(22) Filed: Sep. 27, 2001

(65) Prior Publication Data

US 2003/0061426 A1 Mar. 27, 2003

(51) Int. Cl.[7] .................. G06F 9/48; G06F 13/24
(52) U.S. Cl. ...................... 710/260; 370/912
(58) Field of Search .................. 710/260, 62, 261, 710/48, 266, 310; 709/235, 250, 231, 220, 301; 713/502; 370/402, 412, 912; 718/108

(56) References Cited

U.S. PATENT DOCUMENTS

| | | | |
|---|---|---|---|
| 5,367,643 A | * 11/1994 | Chang et al. | .................. 710/62 |
| 5,634,015 A | * 5/1997 | Chang et al. | ............... 710/310 |
| 5,708,817 A | 1/1998 | Ng et al. | |
| 5,717,932 A | 2/1998 | Szczepanek et al. | |
| 6,115,776 A | 9/2000 | Reid et al. | |
| 6,195,725 B1 | 2/2001 | Luhmann | |
| 6,216,182 B1 | * 4/2001 | Nguyen et al. | ............... 710/48 |
| 6,256,660 B1 | 7/2001 | Govindaraju et al. | |
| 6,434,651 B1 | * 8/2002 | Gentry, Jr. | .................. 710/260 |
| 6,467,008 B1 | * 10/2002 | Gentry et al. | ............... 710/261 |

OTHER PUBLICATIONS

"Effects of feedback delay on the performance of the transfer-controlled procedure in controlling CCS network overloads" by D.E. Smith (abstract only).*
"Time threshold dimensioning and overload control in FDDI networks" by M. Tangemann (abstract only).*
U.S. Appl. No. 09/409,626, filed Sep. 30, 1999, Dunlap et al.

* cited by examiner

Primary Examiner—Gopal C. Ray
(74) Attorney, Agent, or Firm—Blakely, Sokoloff, Taylor & Zafman LLP (57) ABSTRACT

A method and apparatus for moderating packet ingress interrupts. A network interface includes a packet timer and an absolute timer or absolute counter. The packet timer functions to minimize packet latency during periods of low packet ingress at the network interface. Each of the absolute timer and absolute counter functions to minimize CPU load and packet latency during periods of high packet ingress at the network interface.

42 Claims, 8 Drawing Sheets

APPARATUS AND METHOD FOR PACKET INGRESS INTERRUPT MODERATION

FIELD OF THE INVENTION

The invention relates generally to computer networking and, more particularly, to an apparatus and method for moderating interrupts asserted upon receipt of packets at a network interface.

BACKGROUND OF THE INVENTION

A network interface may receive hundreds—and, in some instances, thousands—of packets per second, but such a network interface may also receive packets at a rate of only a few packets per second. The network interface asserts an interrupt to signal the receipt of these packets, the interrupt indicating receipt of a packet (or packets) to a network driver, as well as to the protocol stack and applications that need the packet data. This interrupt, which indicates receipt of one or more packets at a network interface, is commonly referred to as a "packet ingress" interrupt. In many applications, such as, for example, in highly pipelined processors, interrupts are inefficient, and a high rate of interrupt generation can drastically increase the load on a CPU (central processing unit) or other processing device.

During periods of high packet ingress, in which a corresponding large number of interrupts are generated, the CPU is highly utilized for interrupt processing. The CPU is, therefore, bandwidth limited and may be unable to service all received packets and, accordingly, the processing resources available to other system components—such as the protocol stack, operating system, and application programs—are reduced. Further, a high rate of packet ingress (and the corresponding high rate of interrupt generation) can lead to delays in sending acknowledgements and may cause subsequently received packets to be lost. Thus, a high rate of interrupt generation due to packet ingress can reduce overall throughput and system reliability.

To alleviate the problems associated with high packet ingress rates, a network interface may moderate the assertion of interrupts. Generally, interrupt moderation enables a single interrupt to signal receipt of multiple packets, thereby reducing the number of interrupts generated during high traffic periods. Signaling receipt of multiple packets with one interrupt may be especially useful, if not essential, for high-speed applications. However, during periods of low packet ingress, interrupt moderation can itself add latency and reduce throughput, as a packet may have to "wait" for additional packets to be received before an interrupt signaling arrival of that packet (as well as the additional packets) is asserted.

One conventional method of interrupt moderation utilizes a timer. The timer is set to a pre-determined threshold and is started upon receipt of a packet (i.e., when an interrupt would normally be asserted). Subsequent events—e.g., receipt of an additional packet—do not affect or restart the timer, and the timer continues to count down (or count up). Upon expiration of the timer (i.e., upon passage of a timer period equal to the pre-determined threshold), an interrupt is asserted to indicate the receipt of the initial packet (i.e., the packet that triggered the timer) as well as all subsequent packets received prior to expiration of the timer. Thus, the timer enables a plurality of events—e.g., arrival of a packet—to occur before asserting the interrupt, and a single interrupt can indicate receipt of multiple packets. However, although relatively simple to implement, the use of a timer exhibits a number of undesirable characteristics.

One drawback of the timer method is that assertion of an interrupt is delayed for each received packet, irrespective of the rate of packet ingress. During periods of heavy traffic, the timer method functions well, as a single interrupt will, in most instances, indicate the receipt of multiple packets. However, in practice, network traffic is "bursty" in nature and prolonged periods of sustained heavy traffic (or sustained low traffic) are a typical. Thus, a network interface implementing the timer would not receive a sustained high rate of packets for which the timer method is best suited. When a single packet (or a small number of packets) is received during a period of low traffic, assertion of an interrupt signaling receipt of that packet will be delayed until the timer expires, even though no other subsequent packets (or only a few subsequent packets) have been received.

If the timer is set to a high threshold, the timer will add latency and reduce throughput during periods of low packet ingress. Setting the timer's threshold to low, however, is also problematic, as interrupts will not be adequately moderated, which can also reduce throughput. To strike a balance between a high timer threshold and a low timer threshold, both of which can add latency to packet processing, the timer is usually set to a threshold representing a time necessary for receipt of one to two packets, which allows two to three packets to be received per interrupt without excessive delay for any one packet.

To optimize the timer method for a broader range of packet ingress rates, algorithms have been developed to dynamically adjust the timer threshold based on traffic loads. These algorithms can only sample past data and, depending on the sample rate of such an algorithm, when network traffic changes abruptly, thousands of packets may be received before the algorithm can adapt the timer threshold to the "new" environment. As noted above, network traffic tends to be bursty in nature and, accordingly, these dynamic algorithms are, in practice, not optimized for most network environments.

Other methods for moderating the generation of packet ingress interrupts at a network interface are known in the art. However, these methods—some of which require a microprocessor, a microcontroller, or a complex, dedicated state machine for effective implementation—are complex and expensive to implement.

DETAILED DESCRIPTION OF THE INVENTION

Figure 1:
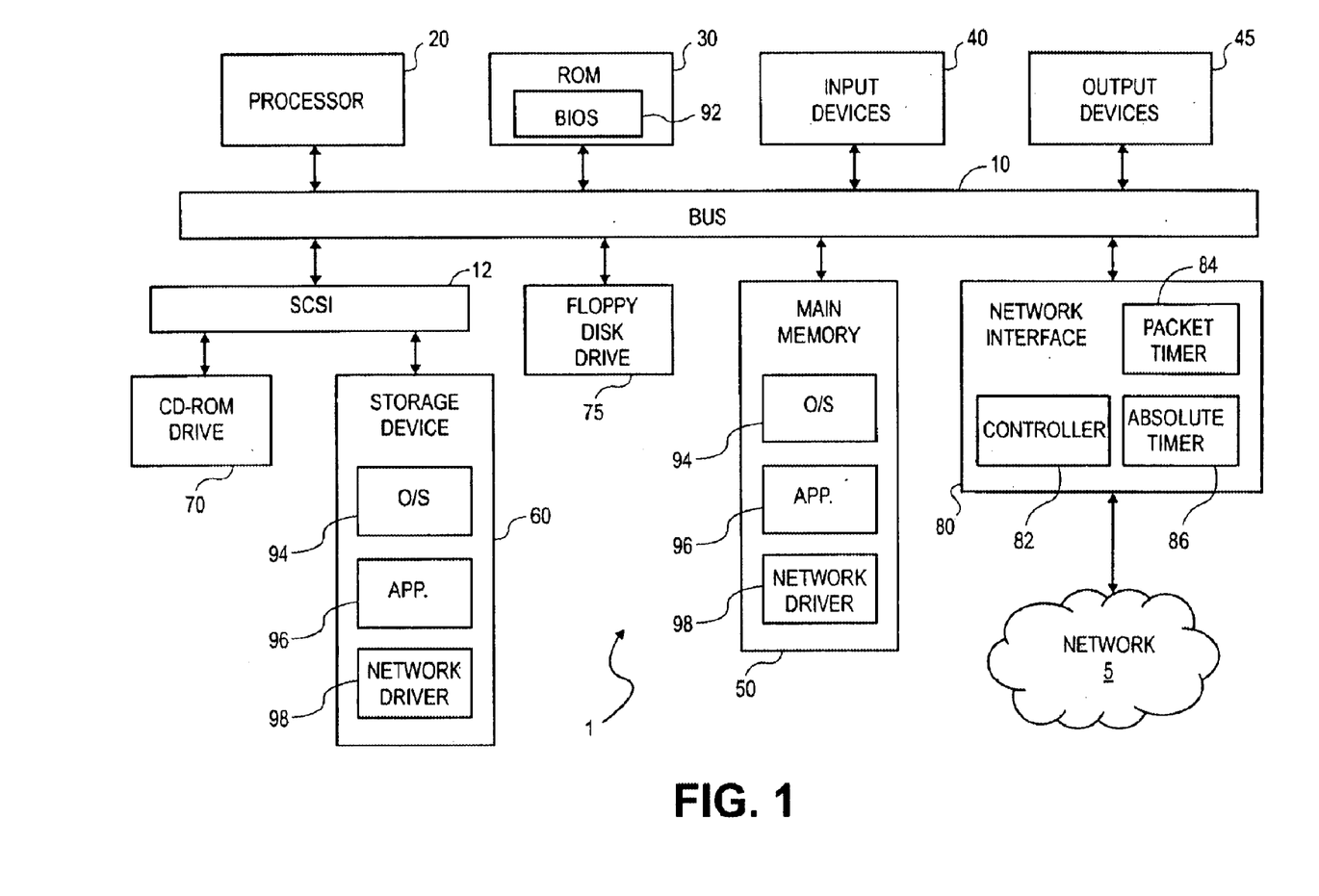
FIG. 1 is a schematic diagram illustrating one embodiment of a system for implementing a method of packet ingress interrupt moderation.

Referring to FIG. 1, a system 1 includes a bus 10 having a processor 20 coupled therewith. The processor 20 may comprise any microprocessor, ASIC (application specific integrated circuit), or other suitable processing device. A read-only memory (ROM) 30, or other equivalent memory, may also be coupled with the bus 10, and the ROM 30 may have a system BIOS (basis input/output system) 92 resident thereon. In addition, one or more input devices 40, as well as one or more output devices 45, may be coupled with the bus 10. Common input devices 40 include keyboards, pointing devices such as a mouse, and scanners or other data entry devices, while typical output devices 45 include video monitors, printers, and audio output devices (e.g., a sound card and/or speakers).

A main memory 50, or other equivalent memory, is coupled with the bus 10, the main memory 50 comprising, for example, dynamic random access memory (DRAM). An operating system (O/S) 94 and one or more application programs 96 may be resident in the main memory 50 during operation of the system 1. One or more drivers, such as a network driver 98, may also be resident in main memory 50. The operating system 94, application programs 96, and network driver 98 may be stored in a storage device 60, the storage device 60 comprising, for example, a hard disk drive or other suitable non-volatile memory. The storage device 60 may be coupled with the bus 10 via a Small Computer System Interface (SCSI) bus 12 (see, e.g., the SCSI-3 family of specifications). Further, the system 1 may include one or more removable memory devices. For example, a CD-ROM drive 70 may be coupled with the bus 10 via SCSI bus 12, and a floppy disk drive 75 may also be coupled with the bus 10.

The system 1 is coupled with a network 5 by a network interface 80. The network interface 80 may be coupled with any type of network 5—including the Internet, a wide area network (WAN), a metropolitan area network (MAN), or a local area network (LAN)—exhibiting any suitable network architecture. The network interface 80 may be integrated directly into the system 1 (e.g., provided by instructions and/or circuitry disposed on a motherboard). Alternatively, the network interface 80 may comprise a separately attached peripheral card, such as a network interface card (NIC). For example, the network interface 80 may comprise a PCMCIA (Personal Computer Memory Card International Association) compatible peripheral card—see, e.g., *PC Card Standard*, March 1997 Release—or a PCI (Peripheral Component Interconnect) compatible peripheral card—see, e.g., PCI *Local Bus Specification*, Revision 2.2. Further, the network interface 80 may communicate with the network 5 via any suitable media, including copper wire or other cabling, fiber optic cable, or a wireless media.

The network interface 80 provides an interface between the network 5 and the system 1. For example, the network interface 80 may receive a packet (or packets) of data from the network 5 and indicate receipt—by asserting an interrupt—of the packet(s) to the network driver 98. Further, upon processing of the interrupt by the network driver 98, receipt of the packet(s) may be indicated to the system component (e.g., operating system 94 or an application program 96) to which the packet is directed (e.g., as identified by a socket address). The network interface 80 may also send packets from the system 1 out onto the network 5.

Figure 2:
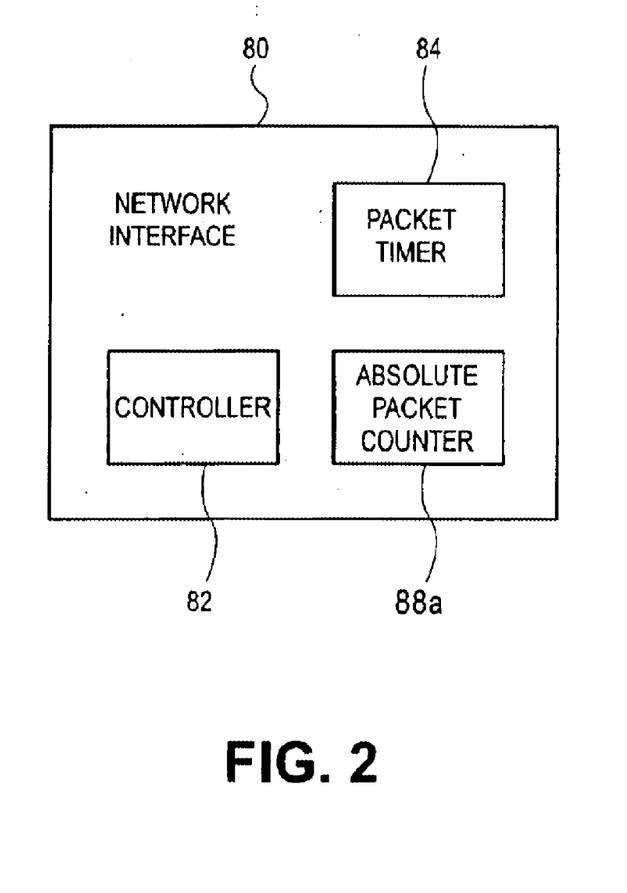
FIG. 2 is a schematic diagram illustrating another embodiment of a system for implementing a method of packet ingress interrupt moderation.
Figure 3:
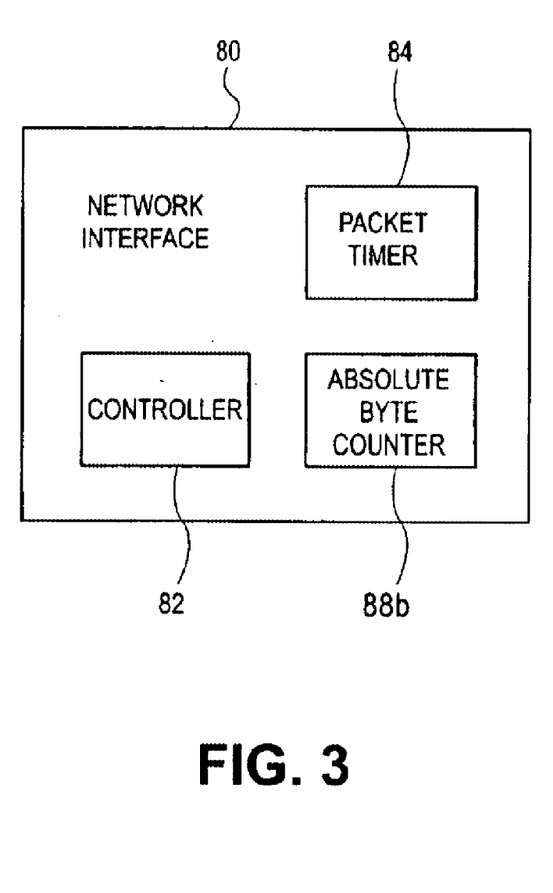
FIG. 3 is a schematic diagram illustrating a further embodiment of a system for implementing a method of packet ingress interrupt moderation.

In one embodiment, the network interface 80 includes a controller 82, a packet timer 84, and an absolute timer 86 (see FIG. 1). In another embodiment, in lieu of an absolute timer 86, the network interface includes an absolute counter. For example, as shown in FIG. 2, the network interface 80 may include an absolute packet counter 88a or, as illustrated in FIG. 3, the network interface 80 may include an absolute byte counter 88b. Each of the controller 82, packet timer 84, absolute timer 86, absolute packet counter 88a, and absolute byte counter 88b may be implemented in hardware (e.g., packaged integrated circuits or other circuitry), software, firmware (i.e., instructions stored in a ROM or other programmable memory), or any suitable combination thereof.

When any one of the packet timer 84 and absolute timer 86 (or absolute packet counter 88a or absolute byte counter 88b) expires, as will be explained below, the controller 82 will assert an interrupt to indicate receipt of a packet or packets. Generally, this interrupt is received by the network driver 98, which is executing on processor 20, and the network driver 98 includes an interrupt service routine (ISR) that will process the interrupt. Upon receipt and handling of the interrupt, receipt of the packet(s) may be indicated to the operating system, protocol stack, applications programs, or other system component that requires the data.

During operation of system 1, multiple interrupts may be asserted by the network interface 80 to indicate receipt of a plurality of packets. Each of these interrupts may actually comprise the same interrupt (i.e., an interrupt asserted at the same pin or status bit), and it is assumed herein—for clarity and ease of understanding—that the interrupt asserted upon receipt of any packet is asserted at the same pin. This interrupt will be referred to herein as the "packet ingress" interrupt. However, it should be understood that, when multiple interrupts are generated in response to receipt of a plurality of packets, these interrupts may be asserted at two or more pins and, further, that these interrupts may be viewed as being "different" interrupts. It is within the scope of the present invention that multiple interrupts generated upon receipt of a plurality of packets may be asserted at different pins.

The function of the packet timer 84 is to minimize latency during periods of low packet ingress at network interface 80. The packet timer 84 has a threshold that will be referred to herein as the "first" threshold. Generally, the first threshold corresponds to a time period that is greater than a minimum inter-frame gap (IFG) but that is less than the sum of the minimum IFG and a packet time; however, it should be understood that the first threshold may correspond to any other suitable time period. The IFG is the time differential between incoming packets and the minimum, allowable IFG is generally a known value that is a function of the network architecture and/or other characteristics of the system 1 and/or network 5. The packet time may correspond to, for example, the time necessary for receipt of a packet or the time necessary to determine the destination address of a packet. All packets arriving at network interface 80 may not exhibit the same characteristics—e.g., all packets may not be of identical byte length—and, therefore, each incoming packet may have a unique packet time. Accordingly, an average expected packet time may be used in determining the first threshold.

The function of the absolute timer 86 and the absolute counters 88a, 88b, respectively, is to minimize latency during periods of high packet ingress at network interface 80. Each of the absolute timer 86, absolute packet counter 88a, and absolute byte counter 88b has a threshold—which will be referred to herein as the "second" threshold—that generally corresponds to a maximum latency or to a selected number of packets that are to be received during high traffic periods before assertion of the packet ingress interrupt. The selected number of packets may be a function of available memory resources in the system 1 and/or network interface 80. For the absolute timer 86, the second threshold corresponds to the maximum latency or to a pre-determined time period in which the selected number of packets may be received. For the absolute packet counter 88a, the second threshold may correspond to the selected number of packets and, for the absolute byte counter 88b, the second threshold represents a total number of bytes that may be present in the selected number of packets. As noted above, incoming packets at network interface 80 may exhibit varying characteristics. For example, incoming packets may have different byte lengths and/or may be separated in time by varying IFGs. Accordingly, the second threshold may be based on average characteristics of incoming packets. For example, the second threshold for the absolute timer 86 may be based on a multiple of the average expected packet time or based on a multiple of the sum of an average IFG and the average expected packet time. Similarly, the second threshold for the absolute byte counter 88b may be based on an average expected packet length.

Figure 4:
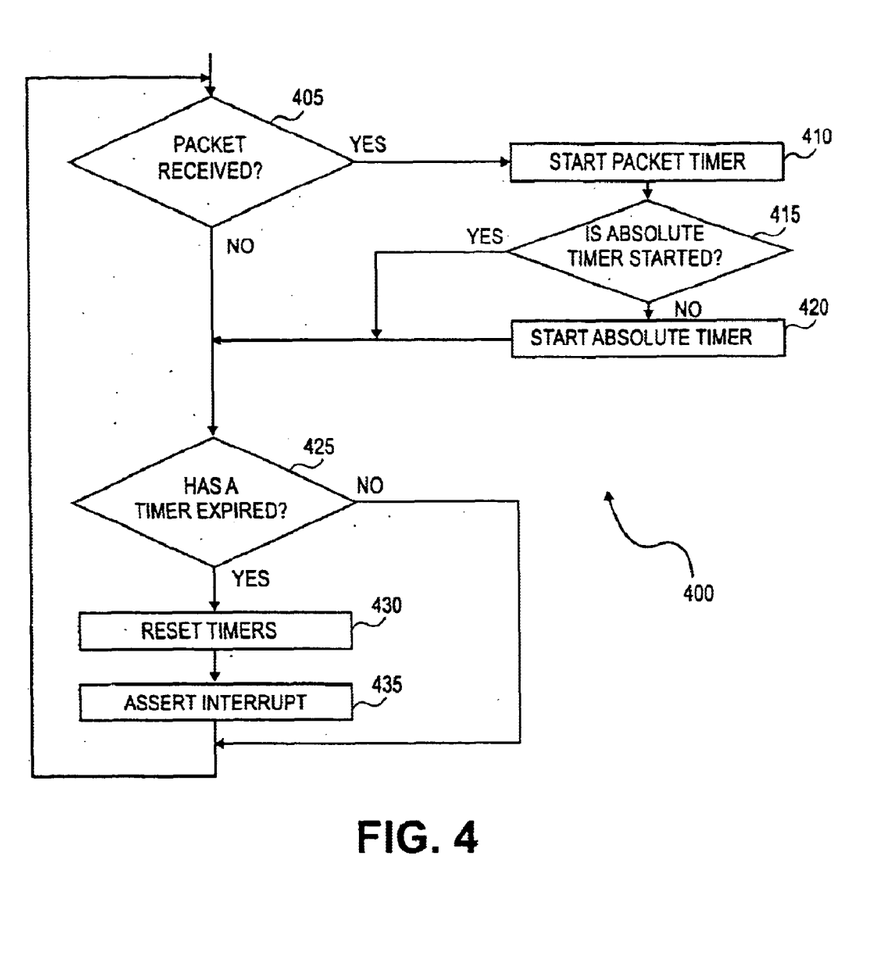
FIG. 4 is a flow chart illustrating one embodiment of a method of packet ingress interrupt moderation.

A method 400 of moderating packet ingress interrupts, as may be implemented in a network interface 80 having a packet timer 84 and an absolute timer 86 (see FIG. 1), is illustrated in FIG. 4. As noted above, the packet timer 84 is set to, or exhibits, a first threshold, and the absolute timer 86 is set to, or exhibits, a second threshold. Referring to reference numeral 405, if a packet is received, the packet timer 84 is started (or restarted), as denoted at 410. When started, the packet timer 84 will count downwards in time from the first threshold. It is then determined whether the absolute timer 86 has been started—see reference numeral 415—and, if the absolute timer 86 has not been started, the absolute timer 86 is started, as shown at 420. The absolute timer 86 will then count downwards in time from the second threshold.

Referring to reference numeral 425, when either one of the packet timer 84 and absolute timer 86 expires, the packet timer 84 is reset to the first threshold and the absolute timer 86 is reset to the second threshold, both as denoted by reference numeral 430. In addition, as shown at 435, the packet ingress interrupt is asserted upon expiration of either one of the packet and absolute timers 84, 86. The next packet received at network interface 80 will again start the packet timer 84 (see reference numeral 410) and the absolute timer 86 (see reference numeral 420). If neither of the timers 84, 86 has expired (see reference numeral 425), the network interface 80 will continue to monitor for incoming packets (see reference numeral 405) and any subsequently received packet will restart the packet timer 84 (see reference numeral 410).

If the packet timer 84 has expired, which may occur during a period of low packet ingress, the packet ingress interrupt will indicate receipt of the packet that triggered the packet timer 84, as well as receipt of any packet received subsequent to the most recent assertion of the packet ingress interrupt. For example, a packet may be received and, if no other packet is received prior to expiration of the packet timer (i.e., during the time period defined by the first threshold), the packet ingress interrupt will be asserted to indicate receipt of that packet. In a further example, a plurality packets are received at network interface 80, wherein each of the plurality of packets causes the packet timer 84 to restart, as noted above; however, the time period in which these packets are received is less than that defined by the second threshold. After the last of the plurality of packets is received, no other packet is received prior to expiration of the packet timer 84 (the absolute timer 86 having not yet expired). The packet ingress interrupt is then asserted and, in this instance, the packet ingress interrupt indicates receipt of each of the plurality of packets. Accordingly, during low traffic periods, the network interface 80 will not "wait" for additional packets to be received and assertion of the packet ingress interrupt will not be unduly delayed and packet latency is minimized.

If the absolute timer 86 has expired, such as may occur during periods of high packet ingress, the packet ingress interrupt will indicate receipt of the initial packet—i.e., the packet that triggered the absolute timer 86—and all other packets received prior to expiration of the absolute timer 86—i.e., those packet received during the period defined by the second threshold. Thus, in high traffic periods, assertion of the packet ingress interrupt will indicate receipt of multiple packets and, because interrupt processing will not take place for every packet received, the load on processor 20 will be reduced and latency minimized.

Every packet received at the network interface 80 will cause the packet timer 84 to restart, as shown at reference numerals 405 and 410. So long as packets continue to arrive at the network interface 80—each of the packets being separated in time from the preceding packet by a time period (IFG) that, in combination with the packet time, is less than the first threshold—the packet timer 84 will repeatedly be restarted and will not expire (although the absolute timer 86 may expire). Thus, during periods of high packet ingress, the packet ingress interrupt will not be asserted until the absolute timer 86 has expired, thereby allowing a single assertion of the packet ingress interrupt to indicate receipt of a large number of packets.

Figure 5:
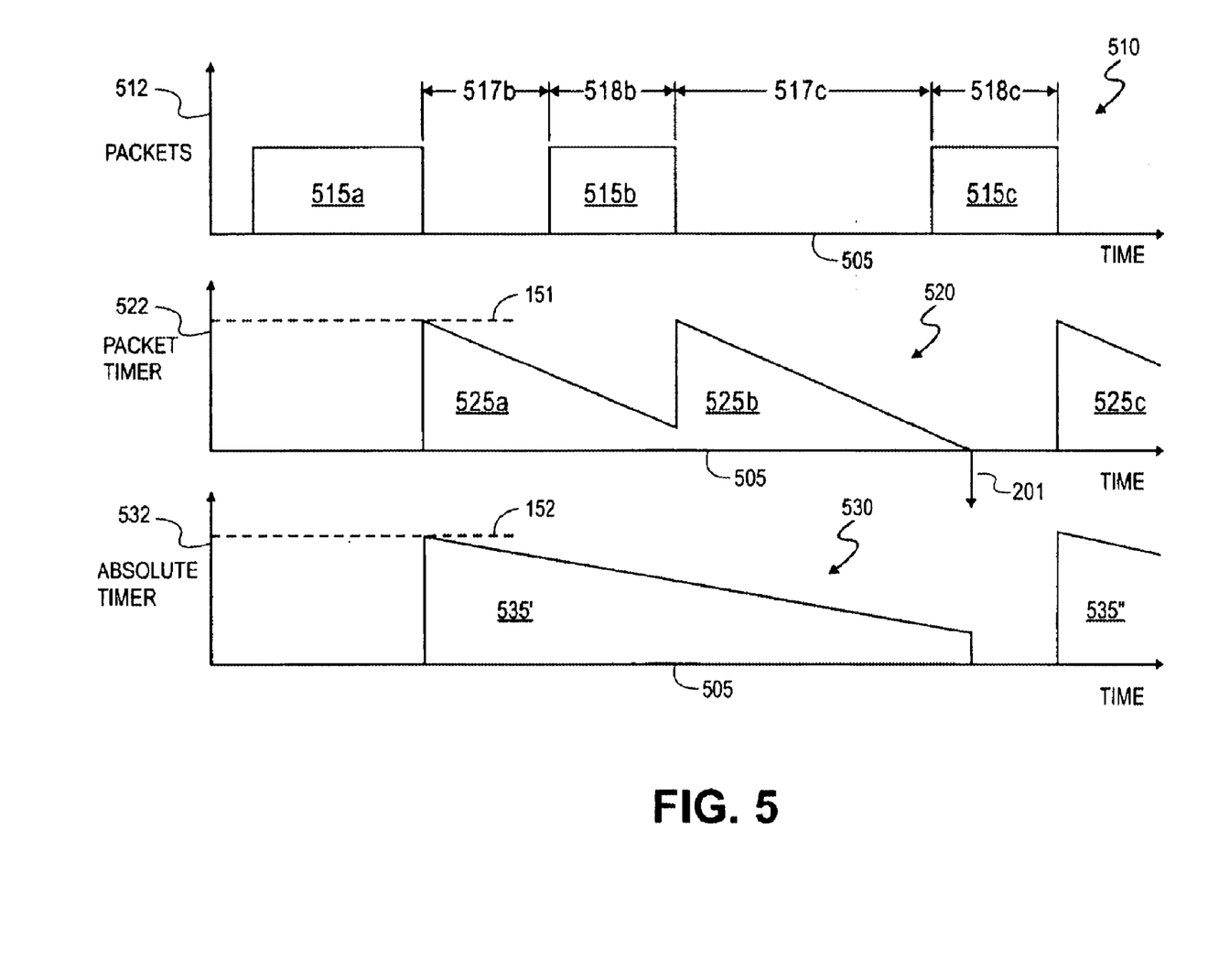
FIG. 5 is a timing diagram illustrating in more detail the method of packet ingress interrupt moderation shown in FIG. 4.
Figure 6:
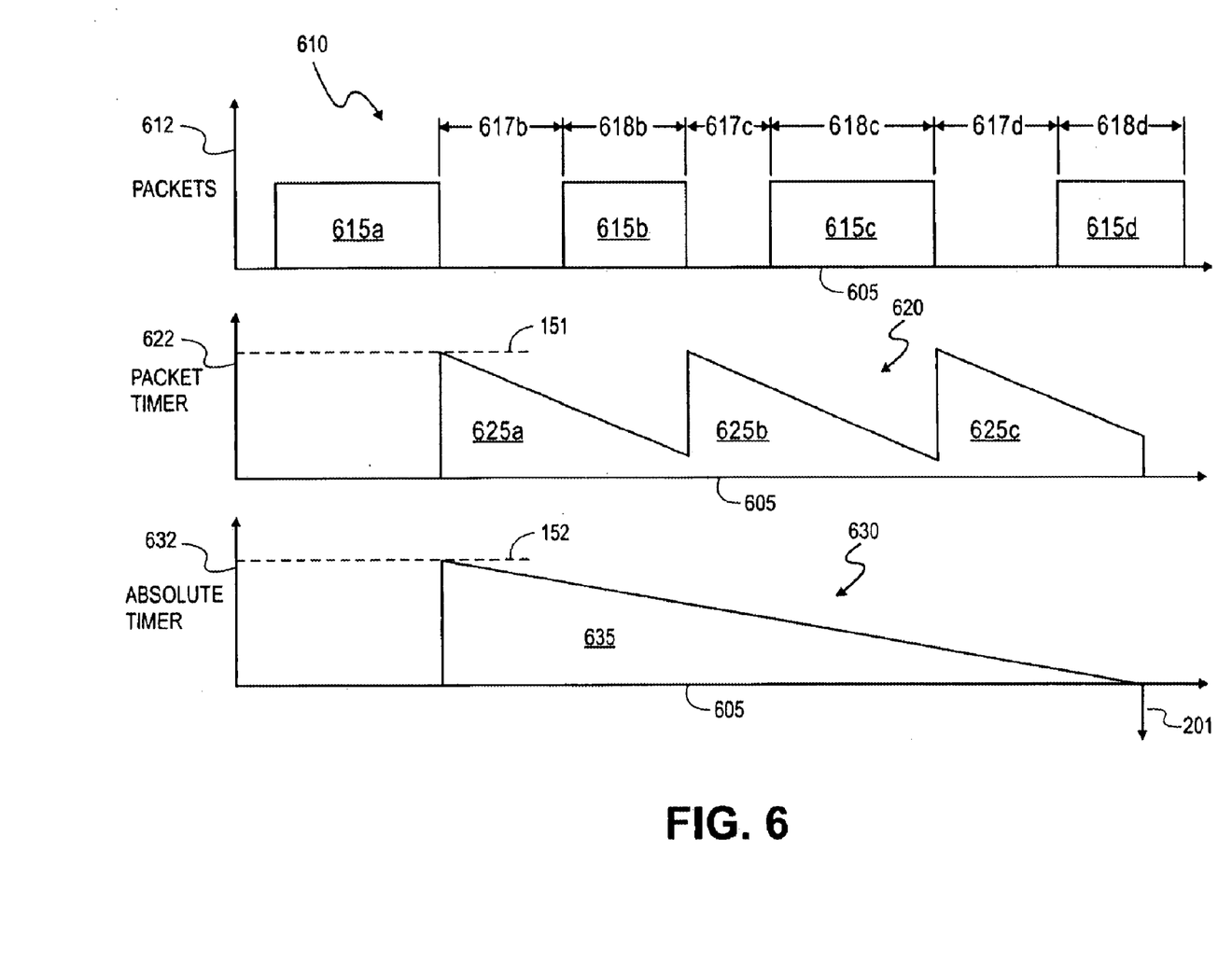
FIG. 6 is another timing diagram illustrating in more detail the method of packet ingress interrupt moderation shown in FIG. 4.

The method 400 of moderating packet ingress interrupts may be further understood by reference to the timing diagrams shown in FIGS. 5 and 6. The timing diagram of FIG. 5 illustrates operation of the network interface 80, as may occur during periods of low packet ingress, and the timing diagram of FIG. 6 illustrates operation of the network interface 80, as may occur during periods of high packet ingress.

Referring to FIG. 5, a graph 510 shows receipt of packets (axis 512) as a function of time (axis 505), a graph 520 shows the state of the packet timer 84 (axis 522) as a function of time (axis 505), and a graph 530 shows the state of the absolute timer 86 (axis 532) as a function of time (axis 505). A first packet 515a is received (see graph 510) at network interface 80, causing the packet timer 84 to start and count downwards in time from the first threshold 151. Also, the absolute timer 86 is started in response to receipt of the first packet 515a, the absolute timer 86 counting downwards in time from the second threshold 152.

Later in time, a second packet 515b is received at the network interface 80. The sum of the IFG 517b between the first and second packets 515a, 515b and the packet time 518b of second packet 515b is less than the first threshold 151—stated another way, when second packet 515b has been received, the packet timer 84 has not yet expired—causing the packet timer 84 to reset to the first threshold 151 and restart. A curve 525a depicts the state of the packet timer 84 after receipt of the first packet 515a, whereas another curve 525b depicts the state of the packet timer 84 after receipt of the second packet 515b. The absolute timer 86 continues to count downwards in time and is unaffected by receipt of the second packet 515b (a curve 535' depicts the state of the absolute timer 86 after receipt of the first packet 515a).

Each of the packet timer 84 (see curve 525b) and absolute timer 86 (see curve 535') continues counting down in time. No subsequent packet is received during the time period defined by the first threshold 151, and the packet timer 84 expires. In response to expiration of packet timer 84, the packet ingress interrupt is asserted, as denoted by arrow 201, and the packet ingress interrupt will indicate receipt of the first and second packets 525a'b. At the time of expiration of the packet timer 84, the absolute timer 86 had not yet expired. Upon expiration of the packet timer 84, each of the packet timer 84 and the absolute timer 86 is reset, the packet timer 84 being reset to the first threshold 151 and the absolute timer being reset to the second threshold 152.

At some later point in time, a third packet 515c is received at network interface 80. The sum of the IFG 517c between the second and third packets 515b, 515c and the packet time 518c of the third packet 515c is greater than the first threshold 151 (causing the packet timer 84 to expire after receipt of the second packet 515b, as noted above). In response to receipt of the third packet 515c, the packet timer 84 is restarted—the packet counter 84 counting downward in time from the first threshold 151—and the absolute timer 86 is again started—the absolute timer 86 counting downward in time from the second threshold 152. A curve 525c depicts the state of the packet timer 84 after receipt of the third packet 515c, and a curve 535" depicts the state of the absolute timer 86 after receipt of the third packet 515c.

Referring now to FIG. 6, a graph 610 shows receipt of packets (axis 612) as a function of time (axis 605), a graph 620 shows the state of the packet timer 84 (axis 622) as a function of time (axis 605), and a graph 630 shows the state of the absolute timer 86 (axis 632) as a function of time (axis 605). A first packet 615a is received (see graph 610) at network interface 80, causing the packet timer 84 to start and count downwards in time from the first threshold 151. Also, the absolute timer 86 is started in response to receipt of the first packet 615a, the absolute timer 86 counting downwards in time from the second threshold 152.

A second packet 615b is subsequently received at network interface 80, the second packet 615b being separated in time from the first packet by an IFG 617b and having a packet time 618b. The sum of the IFG 617b and packet time 618b for the second packet 615b is less than the first threshold 151 and, therefore, the packet timer 84 does not expire prior to receipt of the second packet 615b. Accordingly, the packet timer 84 resets to the first threshold 151 and restarts in response to receipt of the second packet 615b. A curve 625a depicts the state of the packet timer 84 after receipt of the first packet 615a, and a curve 625b depicts the state of the packet timer 84 after receipt of the second packet 615b.

Later in time, a third packet 615c is received at the network interface 80. The third packet 615c is separated in time from the second packet 615b by an IFG 617c, and the third packet 615c has a packet time 618c. The sum of the IFG 617c and packet time 618c associated with the third packet 615c is less than the first threshold 151, and the packet timer 84 will, therefore, not expire prior to receipt of the third packet 615c. Thus, in response to receipt of the third packet 615c, the packet timer 84 resets and restarts. A curve 625c depicts the state of the packet timer 84 after receipt of the third packet 615c.

The absolute timer 86 is unaffected by receipt of the first, second, and third packets 615a–c; it simply counts downward in time from the second threshold 152. The successive arrival of the first, second, and third packets 615a–c has prevented the packet timer from expiring (i.e., the packet timer 84 has been reset and restarted in response to arrival of the second and third packets 615b, 615c, respectively) and, at some point in time after receipt of the third packet 615c, the absolute timer 86 expires (i.e., a time period corresponding to the second threshold 152 has passed). A curve 635 depicts the state of the absolute timer 86 after receipt of the first packet 615a. Upon expiration of the absolute timer, the packet ingress interrupt is asserted, as denoted by arrow 201, and the packet ingress interrupt will indicate receipt of the first, second, and third packets 615a–c. Also, in response to expiration of the absolute timer 86, the packet timer 84 is reset to the first threshold 151 and the absolute timer 86 is reset to the second threshold 152.

A fourth packet 615d is subsequently received at the network interface 80. The fourth packet is separated in time from the third packet 615c by an IFG 617d and has a packet time 618d. The sum of the IFG 617d and packet time 618d of the fourth packet 615d is less than the first threshold 151; however, the packet timer 84 has already been reset to the first threshold 151 after expiration of the absolute timer 86. Receipt of the fourth packet 615d will simply restart the packet timer 84 and restart the absolute timer 86, the packet and absolute timers 84, 86 again counting downwards in time from the first and second thresholds 151, 152, respectively.

In the text set forth above with respect to FIGS. 1 through 6, the packet timer 84 has been described as counting downwards in time from the first threshold (i.e., from the first threshold to zero, unless the packet timer 84 is reset prior to expiration). Similarly, the absolute timer 86 has been described as counting downwards in time from the second threshold (i.e., from the second threshold to zero, unless reset prior to expiration). It should be understood, however, that the packet timer 84 may count upwards in time—i.e., from zero to the first threshold, unless reset prior to expiration—and, further, that the absolute timer 86 may count upwards in time—i.e., from zero to the second threshold, unless reset prior to expiration. Thus, use of the terms "expiration", "expired", and "expires" with respect to the first threshold refer herein to the passage of a period of time equivalent to the first threshold, irrespective of whether the packet timer 84 is counting upwards in time or downwards in time. Similarly, use of these terms ("expiration"; "expired"; "expires") with respect to the second threshold refer herein to the passage of a period of time equivalent to the second threshold, irrespective of whether the absolute timer 86 is counting upwards or downwards in time. Further, although FIGS. 5 and 6 depict the timers 84, 86 as starting (or restarting) at completion of the ingress operation of a packet from the network 5 to network interface 80, it should be understood that the timers 84, 86 (as well as the absolute packet and byte counters 88a, 88b) may be triggered at the beginning of a packet ingress operation or after some portion of the ingress operation has been completed.

Figure 7:
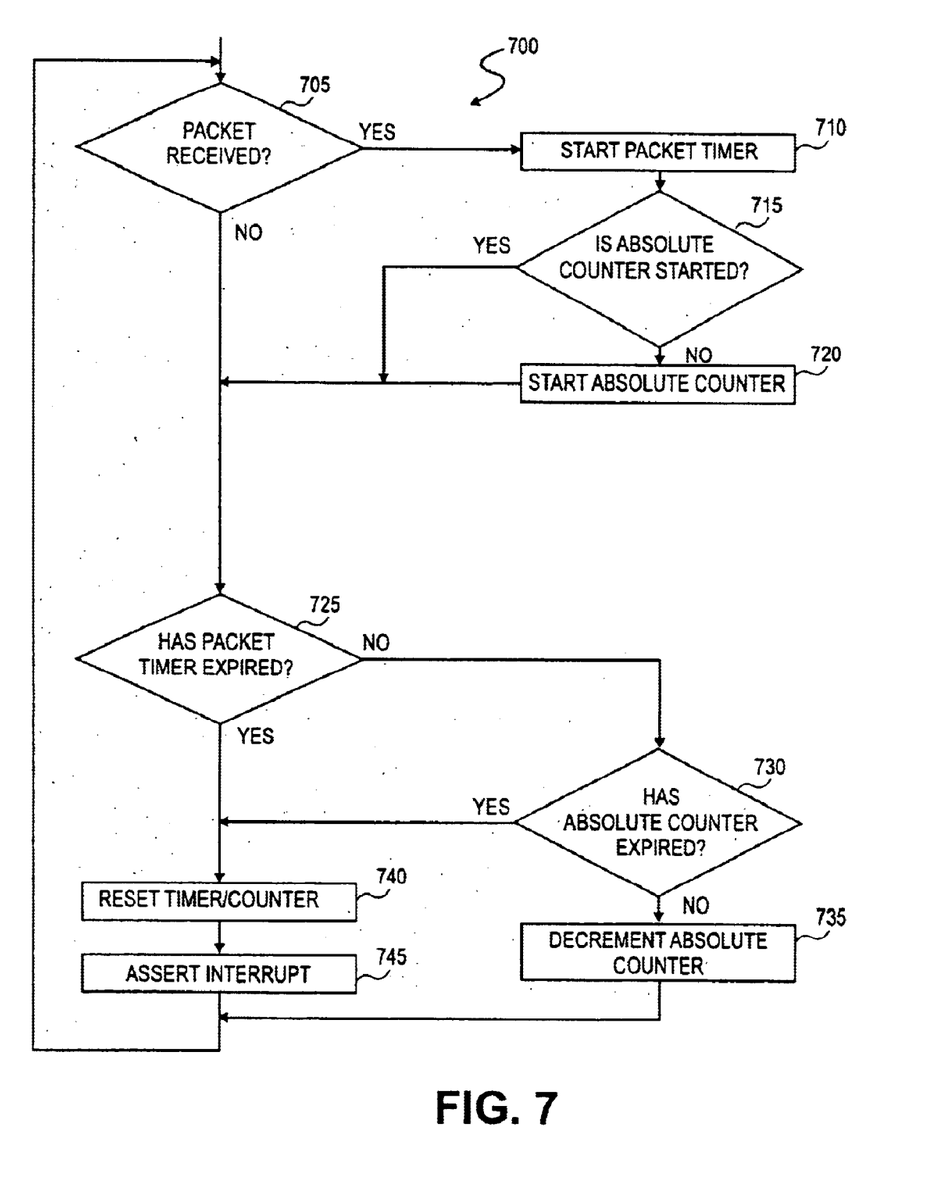
FIG. 7 is a flow chart illustrating another embodiment of a method of packet ingress interrupt moderation.

Illustrated in FIG. 7 is a method 700 of moderating packet ingress interrupts, as may be implemented in a network interface 80 including a packet timer 84 and an absolute counter, such as, for example, an absolute packet counter 88a (see FIG. 2) or an absolute byte counter 88b (see FIG. 3). Again, the packet timer 84 has a first threshold and the counter would have a second threshold. For an absolute packet counter 88*a*, the second threshold corresponds to a selected number of packets (which may be determined based on average packet characteristics, as noted above) that are to be received during periods of high traffic before assertion of the packet ingress interrupt. For an absolute byte counter 88*b*, the second threshold is a number of bytes corresponding to the selected number of packets (which may be determined based on an averaged expected byte length, as noted above).

When a packet is received, as denoted by reference numeral 705, the packet timer 84 is started (see reference numeral 710). The packet timer 84 will count downwards (or upwards) in time from (or to) the first threshold. Referring to reference numeral 715, it is also determined whether the absolute counter—either a packet counter 88*a* or a byte counter 88*b*—has been started and, if the absolute counter has not been started, the absolute counter is started, as shown at 720. Beginning from the second threshold, the absolute counter will be decremented by a number of received packets (for a packet counter 88*a*) or by a number of received bytes (for a byte counter 88*b*). Alternatively, starting from zero, the absolute counter may increment upwards to the second threshold, either by a number of received packets or a number of received bytes, as noted above.

Referring to reference numeral 725, if the packet timer 84 expires, the packet timer 84 is reset to the first threshold and the absolute counter 88*a*, 88*b* is reset to the second threshold, both as shown at 740. Further, the packet ingress interrupt is asserted in response to expiration of the packet timer 84, as denoted by reference numeral 745. The packet ingress interrupt will, in this instance, indicate receipt of the packet that triggered the packet timer 84 and will also indicate receipt of any packet received subsequent to the most recent assertion of the packet ingress interrupt (see FIG. 5 and accompanying text). The next packet received at network interface 80 will restart the packet timer 84 (see reference numeral 710) and the absolute counter 88*a*, 88*b* (see reference numeral 720).

Referring to reference numeral 730, if the absolute counter 88*a*, 88*b* expires, each of the packet timer 84 and absolute counter 88*a*, 88*b* is reset—the packet timer reset to the first threshold and the absolute counter 88*a*, 88*b* reset to the second threshold—as shown at reference numeral 740. In addition, as denoted at 745, the packet ingress interrupt is asserted upon expiration of the absolute counter 88*a*, 88*b*. The packet ingress interrupt will indicate receipt of the packet that triggered the absolute counter 88*a*, 88*b*, as well as all other packets received prior to expiration of the absolute counter 88*a*, 88*b*. Once again, the next packet received at network interface 80 will restart the packet timer 84 (see reference numeral 710) and the absolute counter 88*a*, 88*b* (see reference numeral 720).

If neither of the packet timer 84 and absolute counter 88*a*, 88*b* has expired (see reference numerals 725, 730), the network interface 80 will continue monitoring for incoming packets (see reference numeral 705) and any subsequently received packet will restart the packet timer 84 (see reference numeral 710). Also, if the packet timer 84 has not expired and, further, if the absolute counter 88*a*, 88*b* has not expired, the absolute counter is decremented, as shown at 735. An absolute packet counter 88*a* would be decremented (or incremented) by the packet received at network interface 80—i.e., by one—whereas an absolute byte counter would be decremented (or incremented) by a number of bytes received at network interface 80.

Both of FIGS. 5 and 6, as well as the accompanying text, are generally applicable to the method 700 of packet ingress interrupt moderation shown and described with respect to FIG. 7. Accordingly, each of FIGS. 5 and 6 and the accompanying text are generally applicable to the method 700 shown in FIG. 7. However, rather than counting downwards (or upwards) in time using an absolute timer, an absolute packet counter 88*a* will be decremented (or incremented) by received packets and an absolute byte counter 88*b* will be decremented (or incremented) by a number of received bytes. For the packet counter 88*a*, use of the terms "expiration", "expired", and "expires" with respect to the second threshold refer herein to reception of the selected number of packets, irrespective of whether the absolute packet counter 88*a* is decrementing downwards or incrementing upwards. Similarly, for the byte counter 88*b*, use of the terms "expiration", "expired", and "expires" with respect to the second threshold refer herein to reception of the appropriate number of bytes, irrespective of whether the absolute byte counter 88*b* is decrementing downwards or incrementing upwards.

Figure 8:
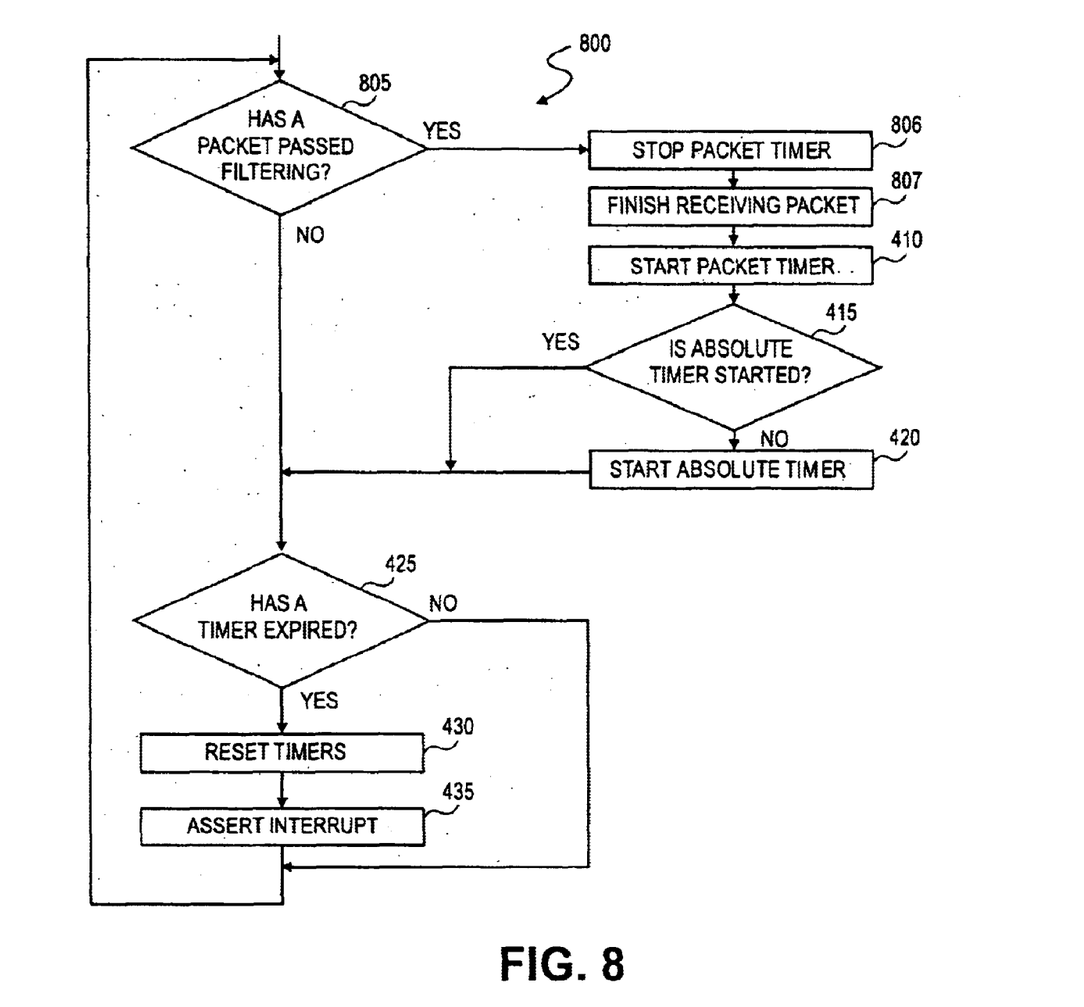
FIG. 8 is a flow chart illustrating a further embodiment of a method of packet ingress interrupt moderation.

Yet a further embodiment of a method 800 of packet ingress interrupt moderation is illustrated in FIG. 8. The method 800 is similar to the method 400 of packet ingress interrupt moderation shown and described with respect to FIG. 4, and those actions illustrated in FIG. 8 that are identical to an action in FIG. 4 have retained the same reference numeral. Further, although the method 800 is shown and described in the context of a network interface 80 having a packet timer 84 and an absolute timer 86, it should be understood that the method 800 is equally applicable to a network interface having either one of an absolute packet counter 88*a* and an absolute byte counter 88*b*.

Referring to FIG. 8, if a packet has passed filtering at network interface 80, as denoted at reference numeral 805, the packet timer (if previously started) is stopped, as shown at 806. Filtering is, by way of example, a process of determining whether to accept—e.g., does the packet have the correct address?—an incoming packet. The network interface 80 finishes receiving the packet—see reference numeral 807—and the packet timer 84 is then started, as denoted at 410. The remaining portions (i.e., reference numerals 415, 420, 425, 430, 435) of the method 800 of FIG. 8 are identical to their respective counterparts in the method 400 shown and described with respect to FIG. 4. By stopping the packet timer 84 when a packet passes filtering and, subsequently, restarting the packet timer 84 after receipt of that packet is complete, variations in packet length are eliminated and the packet timer 84 is concerned only with the inter-frame gap between successive incoming packets.

Figure 9:
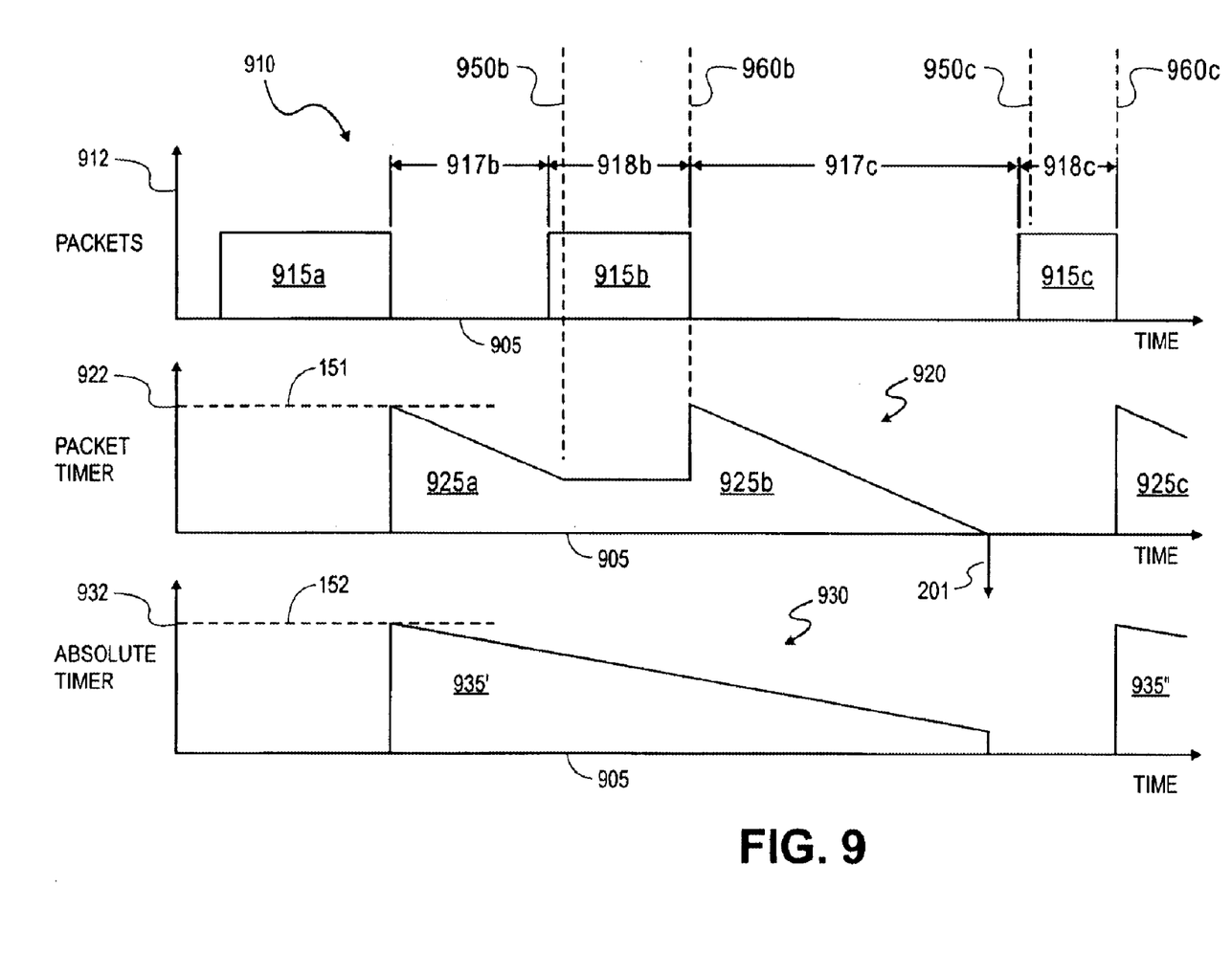
FIG. 9 is a timing diagram illustrating in more detail the method of packet ingress interrupt moderation shown in FIG. 8.

The method 800 of packet ingress interrupt moderation may be better understood by reference to the timing diagram of FIG. 9. With reference to FIG. 9, a graph 910 shows receipt of packets (axis 912) as a function of time (axis 905), a graph 920 shows the state of the packet timer 84 (axis 522) as a function of time (axis 905), and a graph 930 shows the state of the absolute timer 86 (axis 932) as a function of time (axis 905). A first packet 915*a* is received (see graph 910) at network interface 80, causing the packet timer 84 to start and count downwards (or upwards) in time from the first threshold 151. Also, the absolute timer 86 is started in response to receipt of the first packet 915*a*, and the absolute timer 86 counts downwards (or upwards) in time from the second threshold 152.

At some point later in time, a second packet 915*b* arrives at the network interface 80 and, when that packet 915*b* passes filtering (as denoted at 950*b*), the packet timer 84 is stopped. The IFG 917*b* between the first and second packets 915*a*, 915*b* (plus filtering time) is less than the first threshold and, therefore, the packet timer 84 has not yet expired when the packet 915*b* passed filtering. When receipt of the second packet 915*b* is complete (as denoted at 960*b*), the packet timer 84 is reset to the first threshold and restarted. A curve 925*a* depicts the state of the packet timer 84 after receipt of the first packet 915*a*, and a curve 925*b* depicts the state of the packet timer 84 after receipt of the second packet 915*b*. The absolute timer 86 continues to count downwards in time and is unaffected by receipt of the second packet 915*b*. A curve 935' depicts the state of the absolute timer after receipt of the first packet 915*a*.

Subsequently, a third packet 915*c* arrives at the network interface 80 and passes filtering (as denoted by reference numeral 950*c*). However, the IFG 917*c* between the second packet 915*b* and the third packet 915*c* (plus filtering time) is greater than the first threshold 151; thus, the packet timer 84 has expired prior to arrival of the third packet 915*c*. Upon expiration of the packet timer 84, the packet ingress interrupt is asserted, as denoted by arrow 201. The packet ingress interrupt will indicate receipt of the first and second packets 915*a*, 915*b*. Also, in response to expiration of the packet timer 84, each of the packet timer 84 and absolute timer 86 is reset to the first and second thresholds 151, 152, respectively. When receipt of the third packet 915*c* is complete (as denoted at 960*c*), each of the packet timer 84 and absolute timer 86 will restart. A curve 925*c* depicts the state of the packet timer 84 after receipt of the third packet 915*c*, whereas a curve 935" depicts the state of the absolute timer 86 after receipt of the third packet 915*c*.

Embodiments of a method 400, 700, 800 for packet ingress interrupt moderation—as well as embodiments of a network interface 80—having been herein described, those of ordinary skill in the art will appreciate the advantages thereof. Using a packet counter 84 in conjunction with one of an absolute timer 86, an absolute packet counter 88*a*, and an absolute byte counter 88*b*, the load on processor 20 is reduced and packet latency minimized during periods of high packet ingress at network interface 80, while also minimizing packet latency during periods of low traffic. However, no algorithms for predicting future packet ingress rates are necessary. Also, as illustrated by the method 800 of packet ingress interrupt moderation, interrupt moderation can be based primarily on the inter-frame gap between successive packets and variations in packet length can be substantially eliminated.

The foregoing detailed description and accompanying drawings are only illustrative and not restrictive. They have been provided primarily for a clear and comprehensive understanding of the present invention and no unnecessary limitations are to be understood therefrom. Numerous additions, deletions, and modifications to the embodiments described herein, as well as alternative arrangements, may be devised by those skilled in the art without departing from the spirit of the present invention and the scope of the appended claims.

What is claimed is:

1. A method comprising:
    starting a packet timer in response to receipt of a packet, the packet timer having a first threshold;
    starting an absolute timer in response to receipt of the packet, the absolute timer having a second threshold;
    restarting the packet timer when another packet is received prior to expiration of the first threshold;
    asserting an interrupt if the first threshold expires; and
    asserting the interrupt if the second threshold expires.

2. The method of claim 1, further comprising:
    stopping the packet timer when said another packet passes filtering;
    completing receipt of said another packet; and
    restarting the packet timer when receipt of said another packet is complete.

3. The method of claim 1, further comprising providing the interrupt, when asserted, to a network driver.

4. A method comprising:
    starting a packet timer in response to receipt of a packet, the packet timer having a first threshold;
    starting an absolute timer in response to receipt of the packet, the absolute timer having a second threshold;
    receiving another packet prior to expiration of the first threshold; and
    restarting the packet timer.

5. The method of claim 4, further comprising:
    asserting an interrupt if the first threshold expires; and
    asserting the interrupt if the second threshold expires.

6. The method of claim 4, further comprising:
    stopping the packet timer when said another packet passes filtering; and
    restarting the packet timer when receipt of said another packet is complete.

7. A method comprising:
    starting a packet timer in response to receipt of a packet, the packet timer having a first threshold;
    starting an absolute counter in response to receipt of the packet, the absolute counter having a second threshold;
    restarting the packet timer when another packet is received prior to expiration of the first threshold;
    asserting an interrupt if the first threshold expires; and
    asserting the interrupt if the second threshold expires.

8. The method of claim 7, wherein the absolute counter comprises a byte counter, the method further comprising decrementing the byte counter by a number of received bytes when said another packet is received prior to expiration of the first threshold.

9. The method of claim 7, wherein the absolute counter comprises a packet counter, the method further comprising decrementing the packet counter by one packet when said another packet is received prior to expiration of the first threshold.

10. The method of claim 7, further comprising:
    stopping the packet timer when said another packet passes filtering;
    completing receipt of said another packet; and
    restarting the packet timer when receipt of said another packet is complete.

11. The method of claim 7, further comprising providing the interrupt, when asserted, to a network driver.

12. A method comprising:
    starting a packet timer in response to receipt of a packet, the packet timer having a first threshold;
    starting an absolute counter in response to receipt of the packet, the absolute counter having a second threshold;
    receiving another packet prior to expiration of the first threshold; and
    restarting the packet timer.

13. The method of claim 12, wherein the absolute counter comprises a byte counter, the method further comprising decrementing the byte counter by a number of received bytes.

14. The method of claim 12, wherein the absolute counter comprises a packet counter, the method further comprising decrementing the packet counter by one packet.

15. The method of claim 12, further comprising:
asserting an interrupt if the first threshold expires; and
asserting the interrupt if the second threshold expires.

16. The method of claim 12, further comprising:
stopping the packet timer when said another packet passes filtering; and
restarting the packet timer when receipt of said another packet is complete.

17. A network interface comprising:
a packet timer having a first threshold, the packet timer started in response to receipt of a packet from a network, the packet timer restarted in response to receipt of another packet prior to expiration of the first threshold;
an absolute timer having a second threshold, the absolute timer started in response to receipt of the packet from the network; and
a controller to assert an interrupt if the first threshold expires and to assert the interrupt if the second threshold expires.

18. The network interface of claim 17, wherein the packet timer stops when said another packet passes filtering and restarts when receipt of said another packet is complete.

19. The network interface of claim 17, wherein the controller is coupled with a memory having a network driver resident thereon, the controller to provide the interrupt to the network driver.

20. A network interface comprising:
a packet timer having a first threshold, the packet timer started in response to receipt of a packet from a network, the packet timer restarted in response to receipt of another packet prior to expiration of the first threshold;
an absolute counter having a second threshold, the absolute counter started in response to receipt of the packet from the network; and
a controller to assert an interrupt if the first threshold expires and to assert the interrupt if the second threshold expires.

21. The network interface of claim 20, the absolute counter comprising a byte counter, the byte counter decremented by a number of received bytes in response to receipt of said another packet prior to expiration of the first threshold.

22. The network interface of claim 20, the absolute counter comprising a packet counter, the packet counter decremented by one packet in response to receipt of said another packet prior to expiration of the first threshold.

23. The network interface of claim 20, wherein the packet timer stops when said another packet passes filtering and restarts when receipt of said another packet is complete.

24. The network interface of claim 20, wherein the controller is coupled with a memory having a network driver resident thereon, the controller to provide the interrupt to the network driver.

25. A system comprising:
a processor coupled with a bus; and
a network interface coupled with the bus and further coupled with a network, the network interface including
a packet timer having a first threshold, the packet timer started in response to receipt of a packet from a network, the packet timer restarted in response to receipt of another packet prior to expiration of the first threshold;
an absolute timer having a second threshold, the absolute timer started in response to receipt of the packet from the network; and
a controller to assert an interrupt if the first threshold expires and to assert the interrupt if the second threshold expires.

26. The system of claim 25, further comprising:
a main memory coupled with the bus; and
a network driver resident in the main memory, the network driver to process the interrupt.

27. The system of claim 25, wherein the packet timer stops when said another packet passes filtering and restarts when receipt of said another packet is complete.

28. The system of claim 25, the network interface comprising a peripheral card.

29. A system comprising:
a processor coupled with a bus; and
a network interface coupled with the bus and further coupled with a network, the network interface including
a packet timer having a first threshold, the packet timer started in response to receipt of a packet from a network, the packet timer restarted in response to receipt of another packet prior to expiration of the first threshold;
an absolute counter having a second threshold, the absolute counter started in response to receipt of the packet from the network; and
a controller to assert an interrupt if the first threshold expires and to assert the interrupt if the second threshold expires.

30. The system of claim 29, further comprising:
a main memory coupled with the bus; and
a network driver resident in the main memory, the network driver to process the interrupt.

31. The system of claim 29, the absolute counter comprising a byte counter, the byte counter decremented by a number of received bytes in response to receipt of said another packet prior to expiration of the first threshold.

32. The system of claim 29, the absolute counter comprising a packet counter, the packet counter decremented by one packet in response to receipt of said another packet prior to expiration of the first threshold.

33. The system of claim 29, wherein the packet timer stops when said another packet passes filtering and restarts when receipt of said another packet is complete.

34. The system of claim 29, the network interface comprising a peripheral card.

35. An article of manufacture comprising:
a machine accessible medium providing content that, when accessed by a machine, causes the machine to
start a packet timer in response to receipt of a packet, the packet timer having a first threshold;
start an absolute timer in response to receipt of the packet, the absolute timer having a second threshold;
restart the packet timer when another packet is received prior to expiration of the first threshold;
assert an interrupt if the first threshold expires; and
assert the interrupt if the second threshold expires.

36. The article of manufacture of claim 35, wherein the content, when accessed, further causes the machine to:
stop the packet timer when said another packet passes filtering;

complete receipt of said another packet; and restart the packet timer when receipt of said another packet is complete.

37. The article of manufacture of claim 35, wherein the content, when accessed, further causes the machine to provide the interrupt, when asserted, to a network driver.

38. An article of manufacture comprising:

a machine accessible medium providing content that, when accessed by a machine, causes the machine to start a packet timer in response to receipt of a packet, the packet timer having a first threshold;

start an absolute counter in response to receipt of the packet, the absolute counter having a second threshold;

restart the packet timer when another packet is received prior to expiration of the first threshold;

assert an interrupt if the first threshold expires; and assert the interrupt if the second threshold expires.

39. The article of manufacture of claim 38, the absolute counter comprising a byte counter, wherein the content, when accessed, further causes the machine to decrement the byte counter by a number of received bytes when said another packet is received prior to expiration of the first threshold.

40. The article of manufacture of claim 38, the absolute counter comprising a packet counter, wherein the content, when accessed, further causes the machine to decrement the packet counter by one packet when said another packet is received prior to expiration of the first threshold.

41. The article of manufacture of claim 38, wherein the content, when accessed, further causes the machine to:

stop the packet timer when said another packet passes filtering;

complete receipt of said another packet; and restart the packet timer when receipt of said another packet is complete.

42. The article of manufacture of claim 38, wherein the content, when accessed, further causes the machine to provide the interrupt, when asserted, to a network driver.

* * * * *

UNITED STATES PATENT AND TRADEMARK OFFICE
CERTIFICATE OF CORRECTION

PATENT NO.     : 6,868,466 B2
DATED          : March 15, 2005
INVENTOR(S)    : Connor It is certified that error appears in the above-identified patent and that said Letters Patent is hereby corrected as shown below:

Column 2,
Line 8, delete "a typical" and insert -- atypical --.

Signed and Sealed this

Thirty-first Day of May, 2005

JON W. DUDAS
*Director of the United States Patent and Trademark Office*